United States Patent [19]

Bartholic

[11] 4,097,243

[45] Jun. 27, 1978

[54] HYDROCARBON-FEED DISTRIBUTOR OF INJECTING HYDROCARBON FEED

[75] Inventor: David B. Bartholic, Watchung, N.J.

[73] Assignee: UOP Inc., Des Plaines, Ill.

[21] Appl. No.: 738,991

[22] Filed: Nov. 4, 1976

[51] Int. Cl.² ............................................. B01J 8/18
[52] U.S. Cl. ................................. 23/288 S; 23/284;
208/113; 208/164; 208/153; 302/31; 302/28;
302/63; 239/558; 239/590.5; 34/57 A
[58] Field of Search ............. 23/288 S, 284; 208/113;
302/31, 28, 17, 63; 239/557, 558, 590.5, 556,
553.5; 34/57 A

[56] References Cited

U.S. PATENT DOCUMENTS

| 2,610,909 | 9/1952 | Hunter ................................. 23/288 S |
| 2,948,671 | 8/1960 | Packie et al. .................... 23/288 S X |

*Primary Examiner*—James H. Tayman, Jr.
*Attorney, Agent, or Firm*—James R. Hoatson, Jr.;
Thomas K. McBride; William H. Page, II

[57] ABSTRACT

A hydrocarbon-feed distributor for injecting a hydrocarbon feed into contact with a fluidizable catalyst at conversion conditions in the lower end of the riser reactor conduit whereby wall temperatures within the conversion zone are reduced and overcracking of the hydrocarbon feed is minimized.

16 Claims, 6 Drawing Figures

HYDROCARBON-FEED DISTRIBUTOR OF INJECTING HYDROCARBON FEED

BACKGROUND OF THE INVENTION

1. Field of the Invention

The field of art to which this invention pertains is hydrocarbon processing with a fluidizable catalyst. More particularly, in one embodiment the present application relates to a hydrocarbon feed distributor which finds particular utility in the fluidized catalytic cracking process.

2. Description of the Prior Art

The catalytic cracking of hydrocarbon feedstreams is well known. The fluid catalytic cracking (FCC) process wherein the present invention finds particular applicability comprises mixing in a riser reaction zone a hydrocarbon feed having a boiling range of from about 500° F. to about 1200° F. with a fluidizable catalyst and converting therein, at conversion conditions, the hydrocarbon feed into lighter, more valuable, products. Typically the temperature of the hydrocarbon feed is from about 350° F. to about 700° F. and the temperature of the regenerated catalyst is from about 1150° F. to about 1350° F. The two are mixed together to completely vaporize the hydrocarbon feed and to achieve a temperature within the conversion zone of from about 875° F. to about 1100° F. Conversion conditions also typically include low pressures of from about atmospheric pressure to about 100 psig and hydrocarbon residence times of from about 0.5 second to about 5 minutes. Catalyst is normally circulated through the riser reaction zone at a rate of from about 4 to about 20 pounds of catalyst per pound of hydrocarbon feed. The catalyzed reactions may be conducted entirely in a riser reaction zone, as in an all-riser FCC unit, or partially in a riser reaction zone with the mixture of catalyst, reaction products and unconverted feed, if any, then being discharged into a dense bed of fluidized catalyst for further conversion of the feed or of the heavier reaction products into lighter reaction products. The apparatus and method of this invention find utility in either case.

A variety of techniques have heretofore been employed to introduce a hydrocarbon feed into the riser reaction zone. U.S. Pat. No. 3,152,065 for example describes a method of injecting a hydrocarbon feedstock into a catalytic reaction zone which comprises passing the liquid hydrocarbon as an outer stream in a generally linear direction, imparting a centrifugal energy component to the outer stream, passing the outer stream having a centrifugal component through an annulus, and discharging the moving stream through a restricted passageway in contact with an inner stream of a vaporous material such as steam which operates to disperse the hydrocarbon stream into small droplets of liquid. Other vaporous or gaseous materials such as inert gases, nitrogen, natural gas, recycle catalytic cracking unit process gases, etc. can be used as the inner stream. Also disclosed in that same prior art reference is a nozzle for injecting a liquid hydrocarbon feed into contact with a catalyst which nozzle contains components for imparting a centrifugal energy component to material flowing through an outer shell of the nozzle. Both the method and the nozzle are for providing a high degree of atomization of the feedstock and good contacting of the hydrocarbon feedstock and the catalyst. This high degree of atomization is achieved by the use of means of imparting a centrifugal energy component to a liquid hydrocarbon stream and by using a "vaporous material" which operates to disperse the hydrocarbon stream into small droplets. U.S. Pat. No. 3,654,140 describes an improved catalytic cracking process which comprises feeding a substantially liquid hydrocarbon oil feedstock to at least one feed injection zone of a fluidized catalytic cracking reaction zone, concurrently feeding steam to said injection zone in a volumetric ratio of steam to liquid hydrocarbon ranging from about 3 to about 75, thereby imparting to the resulting mixture an exit velocity relative to the fluidized catalyst of at least about 100 feet per second, whereby the oil feedstock is essentially completely atomized forming droplets less than about 350 microns in diameter. The process of this reference relies on the use of steam and very high exit velocities of at least 100 ft/sec to achieve a high degree of feedstock atomization characterized by droplet sizes of less than about 350 microns in diameter.

These prior art processes and apparatus and others have been primarily concerned with the initial contacting of the hydrocarbon feedstock and catalyst to achieve, at least initially, a uniform mixture of catalyst and hydrocarbon feed in the riser reaction zone to avoid excessive coking of the feedstock and attendant product loss. While the initial formation of a uniform catalyst and hydrocarbon mixture is certainly important, it is equally important that the mixture uniformity be maintained as well as possible across a cross-section area of the riser reaction zone at any elevation along the riser reaction zone. More specifically, it has been found that in spite of the use of methods and apparatus to achieve initial uniform contacting of a hydrocarbon feed and a cracking catalyst, wide variations of catalyst density and temperature can exist across cross-sections of typical riser reaction zones, particularly across cross-sections at lower elevations of riser reaction zones. With the use of radiation equipment and probes containing thermocouples, catalyst densities and temperatures in riser reaction zones at different elevations have been measured and catalyst density and temperature contours have been obtained. At lower-elevation cross sections of a riser reaction zone catalyst densities of about 60 lb/cu ft. have been found near the walls while catalyst densities of less than about 3 lb/cu ft. were found on the same cross section but near the riser centerline. Temperature profiles have shown the same wide variation; at lower-elevation cross sections of a riser reaction zone temperatures of 1200° F. and higher have been measured while temperatures near the centerline of the riser were about 650° F. Such high wall temperatures cause elongation of the riser reaction zone and in many instances exceed the design wall temperature and result in permanent deformation of the riser reaction zone. Additionally high wall temperatures cause overcracking of hydrocarbon feed in these regions of higher temperatures and result in increased yields of dry gas ($C_2^-$). The apparatus and method of my invention reduce these high wall temperatures and the problems they cause. My apparatus produces temperature profiles across a cross-section of a riser reaction zone which are more nearly flat thus reducing overcracking and the risk of damage to the riser reaction zone.

SUMMARY OF THE INVENTION

It is, accordingly, an objective of the present invention to provide an improved fluidized catalytic cracking apparatus which overcomes the above noted deficiencies.

It is another objective of my invention to provide a hydrocarbon feed distributor for use in contacting a hydrocarbon feed with a fluidizable catalyst in a riser reaction conduit which distributor will reduce wall temperatures in the conduit thereby reducing overcracking and reducing yields of dry gas.

In brief summary my invention is, in one embodiment, a hydrocarbon-feed distributor for injecting a hydrocarbon feed into contact with a fluidizable catalyst under conversion conditions in a lower end of a riser reactor conduit having a lower end, cylindrical inside and outside walls, a center portion, a hydrocarbon-feed inlet means entering said conduit at said lower end and a regenerated-catalyst inlet means passing through said walls at a distance downstream from said hydrocarbon-feed inlet means, said distributor comprising: a) a truncated cone having a small-diameter end connected to said hydrocarbon-feed inlet means and a large diameter end; b) a circular plate fitted into said large-diameter end, said plate having one or more first holes and a plurality of second holes passing through said plate; and, c) one or more first nozzles having a first inlet means fitted into said first hole and an outlet means positioned to direct hydrocarbon feed into said center portion; and, d) a plurality of second nozzles having second inlet means fitted into said second hole and having second outlet means positioned to direct hydrocarbon feed downstream of said second outlet means and impinge against said inside wall.

In another embodiment my invention is a method of injecting a hydrocarbon feed into contact with a fluidizable catalyst in a catalytic conversion zone having a center portion and an inside wall which comprises: a) passing a first portion of said feed through one or more first nozzles having a first inlet means and a first outlet means, said nozzle being vertically positioned in said conversion zone whereby said first portion is directed from said first outlet means vertically up into said center portion; b) passing a second portion of said feed through multiple second nozzles having second inlet means and second outlet means and positioned in said conversion zone so that a centerline passing through a long axis of a second nozzle is inclined toward the inside wall of said conversion zone at an angle from a vertical centerline passing through the center of a second inlet means whereby said second portion exits said second outlet means and impinges on said inside wall downstream of said second inlet means; and, c) contacting hydrocarbon feed from said first and said second nozzles with said catalyst at conversion conditions.

Other embodiments and objects of my invention encompass further details such as the function and arrangement of various components of my apparatus and operating conditions of my method all of which are hereinafter disclosed in the following discussion of each of these facets of my invention.

BRIEF DESCRIPTION OF THE DRAWING

Having thus described the apparatus of my invention in brief terms, reference is now made to the drawings attached hereto. While the drawings illustrate preferred embodiments of my invention it will be understood that it is not applicant's intention to limit his invention to those embodiments but rather to include all alternatives, modifications and equivalents thereof as may fairly be within the scope and spirit of the claims appended hereto. It will also be understood that the embodiments are only shown in such detail as is necessary for an understanding of the invention and that minor items have been omitted for the sake of simplicity.

Figure 1:
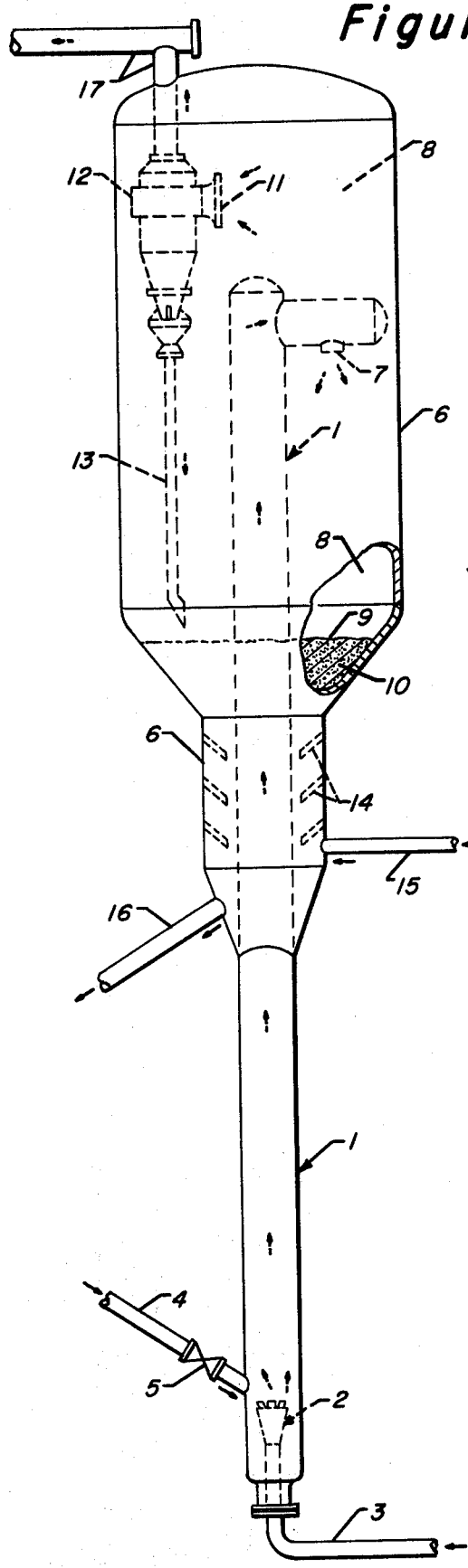
Figure 2:
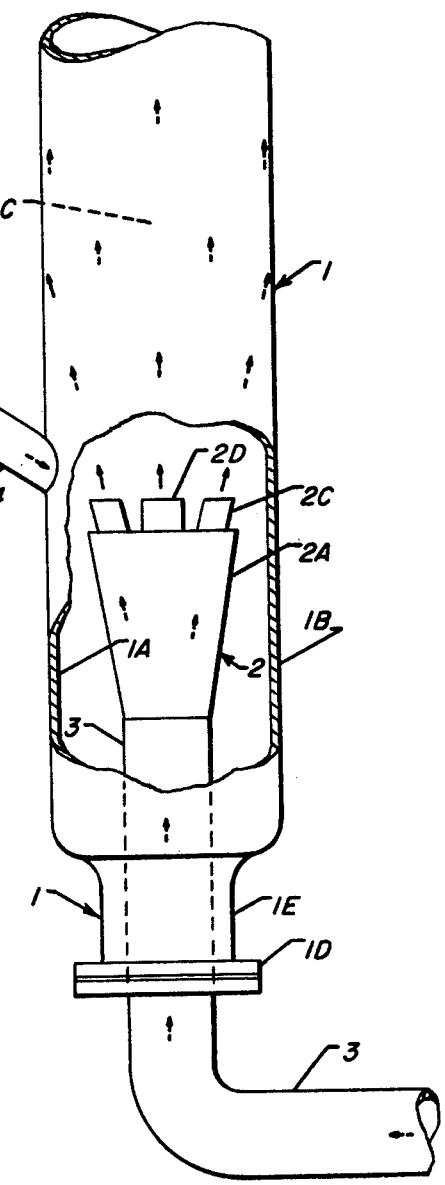
Figure 3:
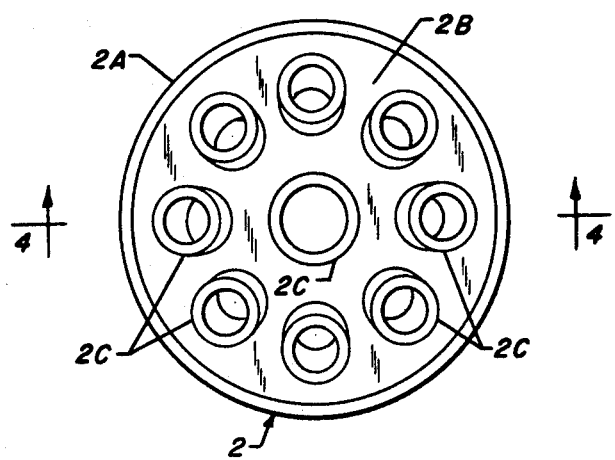
Figure 4:
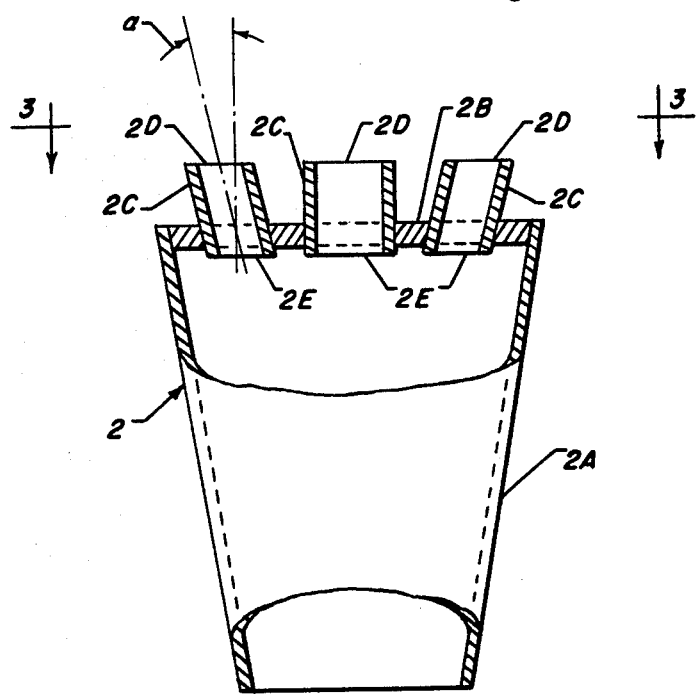
Figure 5:
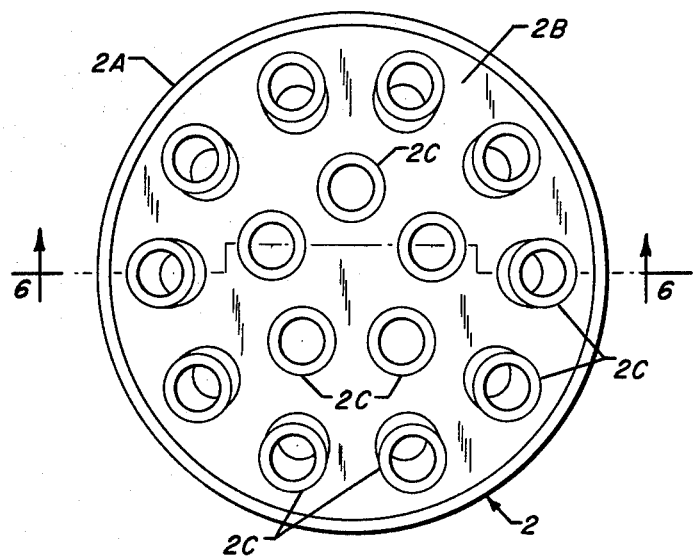

FIG. 1 is a side view of a fluid catalytic cracking apparatus in which the hydrocarbon feed distributor of my invention is incorporated as one component of that apparatus;

FIG. 2 is an enlarged side view of the lower end of the cracking apparatus shown in FIG. 1 and in particular of the lower end of a riser reactor conduit showing in more detail the positioning of the feed distributor in the riser conduit in relation to other components of the cracking apparatus;

FIG. 3 is a top view of one embodiment of a hydrocarbon feed distributor while FIG. 4 is a side sectional view of the same distributor; and FIG. 4 is the top view of another embodiment of a hydrocarbon feed distributor while FIG. 5 is a side view of the same distributor.

DESCRIPTION OF THE INVENTION

A particular environment wherein the present invention finds its greatest utility is in a fluid catalytic cracking apparatus shown in FIG. 1 and comprising a riser reactor conduit 1, a feed distributor 2, a hydrocarbon inlet means 3, a regenerated-catalyst inlet means 4, a reception vessel 6, a cyclone separation means 12, and a spent-catalyst outlet means 16. A hydrocarbon feed, for example, a virgin gas oil boiling within the range of from about 650° F. to about 1200° F., is introduced into the apparatus by way of hydrocarbon-feed inlet means 3. The hydrocarbon feed may be preheated by a fired heater (not shown) or by a system of heat exchangers (not shown) before entering the unit and it is to be understood that recycle streams may also be charged in conjunction with the virgin feed into the unit. The hydrocarbon feed may be in vapor phase or in liquid phase or a mixture of the two but more typically in fluid catalytic cracking process it will be in the liquid phase. Hydrocarbon feed inlet means 3 is connected to hydrocarbon feed distributor 2 through which hydrocarbon feed passes and becomes mixed in the lower portion of conduit 1 with hot regenerated catalyst from a regeneration zone (not shown) which enters conduit 1 through regenerated catalyst inlet means 4 which has flow regulating means 5 located thereon to control the flow of regenerated catalyst. Essentially complete vaporization of the hydrocarbon feed occurs rapidly and conversion of the feed at conversion conditions, including the presence of regenerated catalyst, takes place as the mixture passes upward through conduit 1 which extends vertically upward through the bottom portion of reception vessel 6 into disengaging space 8 within reception vessel 6. Reaction products plus unconverted feed, if any, pass out of conduit 1 via opening 7 located at the upper end of conduit 1 into disengaging space 8 within reception vessel 6. Some separation of hydrocarbon vapors and catalysts occurs within disengaging space 6 because of the decrease in velocity and the change in the direction of flow of the mixture of vapors and catalyst. Separated spent catalyst drops down into dense bed 10 which has an interface shown at 9. Hydrocarbon vapors and any inerts plus any entrained catalyst in disengaging space 8 enter cyclone separation means 12 through inlet 11 and catalyst and vapors are again separated with separated catalyst passing downward toward dense bed 10 through dip leg 13 and vapor passing out of cyclone separator device 12 and out of vessel 6 through vapor conduit 17. Although FIG. 1 shows only one cyclone separation device 12, more than one such device could of course be employed in parallel or series flow arrangements as the volume and loading of the vapor stream and the desired degree of separation dictate. Catalyst in dense bed 10 flows in a downward direction and passes through a lower necked-down section of vessel 6 over baffles 14 and is stripped of adsorbed and interstitial hydrocarbons by a countercurrent stream of stripping medium, generally steam, which enters the lower portion of vessel 6 through stripping medium inlet means 15. Spent catalyst leaves vessel 6 through spent-catalyst conduit 16 and passes to a regeneration apparatus (not shown) wherein coke is oxidized from spent catalyst to produce regenerated catalyst.

Hydrocarbon feed distributor 2 is shown in more detail in FIG. 2 which is an enlarged side view of a lower portion of the apparatus of FIG. 1. Riser conduit 1 has inside wall 1A, outside wall 1B, center portion 1C, flange 1D and necked-down portion 1E. Distributor 2 is shown to have a cone-shaped component 2A having a small diameter end connected to hydrocarbon-feed inlet means 3 and having a large diameter end on which are located nozzles 2C which have outlet means 2D. Hydrocarbon-feed inlet means 3 will typically be joined to riser conduit 1 by flange 1D. Also shown in FIG. 2 is the preferred positioning of distributor 2 so that outlet means 2D of nozzles 2C are below regenerated catalyst inlet means 4. It is believed that the possibility of plugging of one of nozzles 2C with coke, particularly at low hydrocarbon-feed velocities through nozzles 2C as might occur on reduced throughput operations, will be less when distributor 2 is thus positioned than if it were positioned such that outlet means 2D were above regenerated-catalyst inlet means 4. FIG. 2 shows three nozzles 2D in side view; one center nozzle and two outer nozzles. The center nozzle is positioned to direct hydrocarbon feed exiting that nozzle vertically up into center portion 1C of riser conduit 1 and the outer nozzles are positioned so that hydrocarbon feed exiting from those nozzles will impinge on inside wall 1A of conduit 1 downstream of outlet means 2D and preferably downstream of where regenerated-catalyst inlet means 4 enters conduit 1. More preferably the hydrocarbon feed will impinge on inside wall 1A at a distance of 12 inches or more downstream of where regenerated-catalyst inlet means enters conduit 1. Hydrocarbon feed velocity through nozzles 2C will be from about 1 to about 50 ft/sec and more preferably from about 5 to about 20 ft/sec. Impinging hydrocarbon feed from these outer nozzles onto inside wall 1A at these velocities breaks up the wall effect and reduces the wall temperatures so that temperatures at any point on a horizontal cross-sectional plane through conduit 1 become more nearly the same. The beneficial consequences of reduced wall temperatures are reduced over-cracking of the hydrocarbon feedstock and reduced yields of dry gas.

One preferred embodiment of feed distributor 2 is shown in more detail in FIGS. 3 and 4. FIG. 4 shows truncated cone 2A having a small-diameter end and a large-diameter end which is fitted with plate 2B. The diameter of the small-diameter end will be about the same as that of the hydrocarbon-feed inlet means to which the small-diameter end attaches and the diameter of the large-diameter end will be such that it will pass through the flange connecting the riser conduit and the hydrocarbon-feed inlet means and also pass through the necked-down portion of the riser conduit. Plate 2B has a first circular hole passing through the center of the plate and has second circular holes passing through the plate and equally spaced around a circle described by a radius from the center of plate 2B. Cylindrical nozzles 2C have inlet means 2E which are inserted into the first and second holes and have outlet means 2D through which hydrocarbon feed leaves nozzles 2C and distributor 2. A first nozzle 2C is located in the center of the plate and is positioned at a right angle with respect to plate 2B, that is, a vertical centerline will pass through the centers of inlet means 2E and outlet means 2D of that center nozzle. Hydrocarbon feed is thus directed up through this center nozzle up into the center portion of the riser conduit. As illustrated in FIG. 4, second nozzles 2C are arranged in the circle around the center nozzle and are positioned such that a centerline passing through the long axis of a second nozzle is inclined away from the center nozzle at an angle "$a$" from a vertical centerline passing through the center of an inlet means 2E of a second nozzle so that hydrocarbon feed passing through these nozzles will impinge on the inside wall of the riser conduit downstream from nozzle outlet means 2D and more preferably 12 inches or more downstream of where regenerated catalyst inlet means enters the riser conduit. Preferably angle "$a$" will be from about 10° to about 30°. Although seven second nozzles are shown, there may be from 3 to about 30 second nozzles so positioned on plate 2B. The nozzles will be sized in both total number and inside diameter to pass hydrocarbon feed at velocities of from about 1 to about 50 ft/sec and more preferably from about 5 to about 20 ft/sec.

Figure 6:
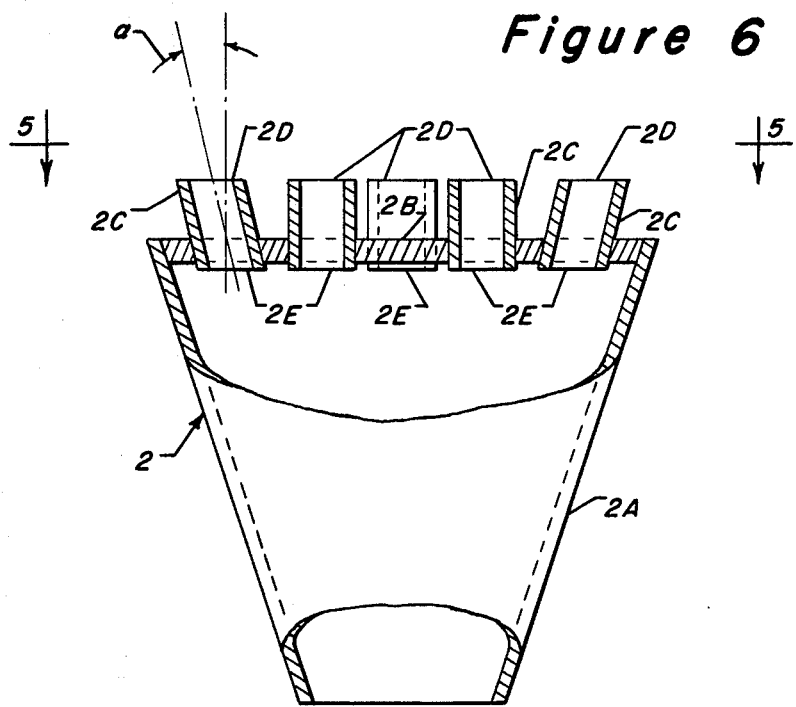

Another preferred embodiment of feed distributor 2 is shown in more detail in FIGS. 5 and 6. Like FIG. 4, FIG. 6 shows truncated cone 2A having a small-diameter end and a large-diameter end which is fitted with plate 2B. In this embodiment however plate 2B has first circular holes passing through plate 2B and equally spaced around a first circle described by a first radius from the center of plate 2B and has second circular holes passing through plate 2B and equally spaced around a second circle, larger than the first circle, described by a second radius from the center of plate 2B. Cylindrical nozzles 2C have inlet means 2E which are inserted into the first and second holes and have outlet means 2D through which hydrocarbon feed leaves nozzles 2C and distributor 2. First nozzles 2C are located on the first circle on the plate and are positioned at right angles with respect to plate 2B, that is, a common vertical centerline will pass through the centers of inlet means 2E and outlet means 2D of each first nozzle 2C. Hydrocarbon feed is thus directed through these first nozzles up into the center portion of the riser conduit. Second nozzles 2C are arranged around the second circle and are positioned such that a centerline passing through the long axis of a second nozzle is inclined away from the first nozzles at an angle "$a$" from a vertical centerline passing through the center of an inlet means 2E of a second nozzle so that hydrocarbon feed passing through these nozzles will impinge on the inside wall of the riser conduit downstream from nozzle outlet means 2D and more preferably 12 inches or more downstream of where the regenerated catalyst inlet means enters the riser conduit. Preferably angle "$a$" will be from about 10° to about 30°. Although 5 first nozzles and 10 second nozzles are shown, there may be from 2 to about 10 first nozzles and from 3 to about 20 second nozzles. The nozzles will be sized in both total number and inside diameter to pass hydrocarbon feed at velocities of from about 1 to about 50 ft/sec and more preferably from about 5 to about 20 ft/sec.

Features common to my distributor in any of its embodiments are that there be one or more first nozzles at right angles to plate 2B; that there be second nozzles positioned in plate 2B such that they are inclined away from a first nozzle and toward the inside wall of the riser conduit; and, that the second nozzles be equally spaced around a circle on plate 2B. First nozzles are positioned at right angles to plate 2B to avoid dead space or regions of slow flow in the center of the conduit. As previously explained, second nozzles are inclined toward the inside wall of the riser conduit so that hydrocarbon feed exiting the second nozzles will impinge upon the inside wall thus breaking up the stagnant boundary layers of hot catalyst near the inside wall of the conduit and reducing the wall temperature of the conduit. Second nozzles are equally spaced on a circle on plate 2B so that hydrocarbon feed from the second nozzles impinges evenly around the inside wall of the riser conduit thus avoiding localized high wall temperatures.

Materials of construction for building my distributor shall be materials which are able to withstand the sustained abrasive, high-temperature conditions found in the lower section of a riser conduit. Specifically, metals such as carbon steel or stainless steel are contemplated. Typically nozzles 2C will be made out of schedule 80 to schedule 160 pipe and plate 2B and truncated cone 2A will be made of ½-inch steel plate. The top surface of plate 2B will preferably be covered with ½ to 1 inch of refractory concrete to provide additional abrasion resistance.

The present invention also contemplates a method of injecting a hydrocarbon feed into contact with a fluidizable catalyst in a catalytic conversion zone having a center portion and an inside wall which comprises: passing a first portion of the hydrocarbon feed through one or more first nozzles having a first inlet means and a first outlet means, the nozzle being vertically positioned in said conversion zone whereby the first portion is directed from the first outlet means vertically up into the center portion; passing a second portion of the hydrocarbon feed through multiple second nozzles having second inlet means and second outlet means and positioned in the catalytic conversion zone so that a centerline passing through a long axis of a second nozzle is inclined toward the inside wall of the conversion zone at an angle from a vertical centerline passing through the center of a second inlet means whereby the second portion exits the second outlet means and impinges on the inside wall downstream of the second inlet means; and, contacting hydrocarbon feed from the first and second nozzles with catalyst at conversion conditions. In one embodiment the first portion of hydrocarbon feed will be passed through a single first nozzle; in another embodiment it will be passed through multiple first nozzles. The first and second portions of hydrocarbon feed will be passed through the first and second nozzles at velocities of from 1 to about 50 ft/sec and more preferably at velocities from about 5 to about 20 ft/sec. Preferably the second portion of the hydrocarbon feed will exit the second outlet means and impinge on the inside wall of the conversion zone at a distance of 12 inches or more downstream of the second inlet means. The hydrocarbon feed can be in liquid or vapor phase or in both liquid and vapor phase but preferably it will be in liquid phase at a temperature of from about 350° F. to about 700° F. Hydrocarbon feed will contact hot catalyst entering the conversion zone at a temperature of from about 1150° F. to about 1350° F. Other conversion conditions within the conversion zone will include a total pressure of from about atmospheric pressure to about 100 psig and a hydrocarbon residence time of from about 0.5 seconds to 5 minutes and more preferably from about 0.5 seconds to about 2 minutes. Conversion conditions may also include the presence of steam or other vaporous material to aid in fluidizing the catalyst and to reduce the hydrocarbon partial pressure which aids in the cracking reaction.

I claim as my invention:

1. A hydrocarbon-feed distributor for injecting a hydrocarbon-feed into contact with a fluidizable catalyst under conversion conditions in a lower end of a vertically disposed riser reactor conduit having a lower end, cylindrical inside and outside walls, a reception vessel, the upper portion of said conduit extending into said vessel, the lower end thereof extending below said vessel, a hydrocarbon-feed inlet means entering said conduit at said lower end and a regenerated-catalyst inlet means passing through said walls at a distance downstream from said hydrocarbon-feed inlet means, said distributor comprising:
   (a) a truncated cone having a small-diameter end connected to said hydrocarbon-feed inlet means and a large diameter end;
   (b) a circular plate fitted into said large-diameter end, said plate having one or more first holes and a plurality of second holes passing through said plate; and,
   (c) one or more first nozzles having a first inlet means fitted into said first hole and an outlet means positioned to direct hydrocarbon-feed upwardly toward the axial center line of and into and through said riser reactor conduit; and,
   (d) a plurality of second nozzles having second inlet means fitted into said second hole and having second outlet means positioned to direct hydrocarbon-feed downstream of said second outlet means and impinge against said inside wall.

2. The distributor as described in claim 1 wherein:
   a. a single first hole is located in the center of said plate and a first nozzle is fitted into said hole; and,
   b. second holes are located on a circle described by a radius from the center of said plate and second nozzles are fitted into said holes.

3. The distributor as described in claim 1 wherein:
   a. first holes are equally spaced around a first circle described by a first radius from the center of said plate and first nozzles are fitted into said first holes; and,
   b. second nozzles are located on a second circle, larger than said first circle, described by a second radius from the center of said plate and second nozzles are fitted into said second holes.

4. The distributor as described in claim 2 wherein said first nozzle is positioned at a right angle to said plate and said second nozzles are positioned so that a centerline passing through a long axis of a second nozzle is inclined at an angle from a vertical centerline passing through the center of a second inlet means whereby hydrocarbon feed passing through a second nozzle exits a second outlet means and impinges on an inside wall of a riser conduit downstream from said second outlet means.

5. A distributor as described in claim 4 wherein said angle is from about 10° to about 30°.

6. The distributor as described in claim 3 wherein said first nozzles are positioned at right angles to said plate and said second nozzles are positioned so that a centerline passing through a long axis of a second nozzle is inclined at an angle from a vertical centerline passing through the center of a second inlet means whereby hydrocarbon feed passing through a second nozzle exits a second outlet means and impinges on the inside wall of a riser conduit downstream from said second outlet means.

7. A distributor as described in claim 6 wherein the angle is from about 10° to about 30°.

8. A hydrocarbon-feed distributor for injecting a hydrocarbon feed into contact with a fluidizable catalyst under conversion conditions in a lower end of a vertically disposed riser reactor conduit having a lower end, cylindrical inside and outside walls, a reception vessel, the upper portion of said conduit extending into said vessel, the lower end thereof extending below said vessel, a hydrocarbon-feed inlet means entering said conduit at said lower end and a regenerated-catalyst inlet means passing through said walls at a distance downstream from said hydrocarbon-feed inlet means, said distributor comprising:
- (a) a truncated cone having a small-diameter end connected to said hydrocarbon-feed inlet means and a large diameter end;
- (b) a circular plate fitted into said large-diameter end, said plate having a first hole passing through said plate located in the center of said plate and having second holes passing through said plate and equally spaced around a circle on said plate described by a radius from the center of said plate;
- (c) a first cylindrical nozzle having a first inlet means fitted into said first hole and a first outlet means, said first nozzle being positioned at a right angle to said plate whereby hydrocarbon-feed passing through said first nozzle exists said first outlet means upwardly toward the axial center line of and into and through said riser reactor conduit; and,
- (d) second cylindrical nozzles having second inlet means fitted into said second holes and second outlet means, said second nozzles being positioned so that a centerline passing through a long axis of a second nozzle is inclined toward said inside wall at an angle from a vertical centerline passing through the center of a second inlet means whereby hydrocarbon-feed passing through said second nozzles exits said second outlet means and impinges on said inside wall downstream of said second outlet means.

9. A distributor as described in claim 8 wherein said angle is from about 10° to about 30°.

10. A distributor as described in claim 8 wherein there are from about 3 to about 30 second nozzles.

11. A distributor as described in claim 8 wherein said hydrocarbon feed exiting said second outlet means impinges on said inside wall at a distance of about 12 inches or more downstream of said regenerated catalyst inlet means.

12. A hydrocarbon-feed distributor for injecting a hydrocarbon feed into contact with a fluidizable catalyst under conversion conditions in a lower end of a riser reactor conduit having a lower end, cylindrical inside and outside walls, a hydrocarbon-feed inlet means entering said conduit at said lower end and a regenerated-catalyst inlet means passing through said walls at a distance downstream from said hydrocarbon-feed inlet means, said distributor comprising:
- a. a truncated cone having a small-diameter end connected to said hydrocarbon-feed inlet means and a large diameter end;
- b. a circular plate fitted into said large-diameter end, said plate having first holes passing through said plate and equally spaced around a first circle described by a first radius from the center of said plate and having second holes passing through said plate and equally spaced around a second circle, larger than said first circle, described by a second radius from the center of said plate;
- c. first cylindrical nozzles having first inlet means fitted into said first holes and first outlet means, said first nozzles being positioned at right angles to said plate whereby hydrocarbon feed passing through said first nozzles exits said first outlet means upwardly into said riser reactor conduit; and,
- d. second cylindrical nozzles having second inlet means fitted into said second holes and second outlet means, said second nozzles being positioned so that a centerline passing through a long axis of a second nozzle is inclined toward said inside wall at an angle from a vertical centerline passing through the center of a second inlet means whereby hydrocarbon feed passing through said second nozzles exits said second outlet means and impinges on said inside wall downstream of said second outlet means.

13. The distributor as described in claim 12 wherein said angle is from about 10° to about 30°.

14. The distributor as described in claim 12 wherein there are from about 3 to about 10 first nozzles.

15. The distributor as described in claim 12 wherein there are from about 3 to about 20 second nozzles.

16. A distributor as described in claim 12 wherein said hydrocarbon feed exiting said second outlet means impinges on said inside wall at a distance of about 12 inches or more downstream of said regenerated catalyst outlet means.

* * * * *